(12) United States Patent
Ishida et al.

(10) Patent No.: US 9,476,474 B2
(45) Date of Patent: Oct. 25, 2016

(54) COPPER ALLOY WIRE AND COPPER ALLOY SPRING

(75) Inventors: Kiyohito Ishida, Sendai (JP); Takayuki Akizuki, Hirakata (JP)

(73) Assignees: Nippon Seisen Co., Ltd., Osaka-shi, Osaka (JP); Kiyohito Ishida, Sendai-shi, Miyagi (JP)

( * ) Notice: Subject to any disclaimer, the term of this patent is extended or adjusted under 35 U.S.C. 154(b) by 102 days.

(21) Appl. No.: 13/993,512

(22) PCT Filed: Dec. 13, 2011

(86) PCT No.: PCT/JP2011/078769
§ 371 (c)(1),
(2), (4) Date: Aug. 30, 2013

(87) PCT Pub. No.: WO2012/081571
PCT Pub. Date: Jun. 21, 2012

(65) Prior Publication Data
US 2014/0010704 A1    Jan. 9, 2014

(30) Foreign Application Priority Data

Dec. 13, 2010   (JP) ................................. 2010-276609

(51) Int. Cl.
*C22F 1/08*   (2006.01)
*H01B 1/02*   (2006.01)
(Continued)

(52) U.S. Cl.
CPC ................. *F16F 1/021* (2013.01); *C22C 9/01* (2013.01); *C22C 9/06* (2013.01); *C22F 1/08* (2013.01); *H01B 1/026* (2013.01)

(58) Field of Classification Search
CPC ............. C22C 9/01; C22C 9/06; C22C 9/10; H01B 1/026; C22F 1/08

USPC ....................................................... 420/486
See application file for complete search history.

(56) References Cited

U.S. PATENT DOCUMENTS

| 2,851,353 | A | * | 9/1958 | Roach et al. ................. 420/486 |
| 4,378,332 | A |   | 3/1983 | Chang et al. |

(Continued)

FOREIGN PATENT DOCUMENTS

| DE | 42 26 692 A1 | 3/1993 |
| GB | 1520721 | * 2/1977 ............... C22C 9/06 |

(Continued)

OTHER PUBLICATIONS

Stobrawa et al., "Precipitation process of the Ni3Al phase in copper-based alloys," J. Achievements in Materials and Manufacturing Engineering, vol. 15, 1-2, Mar.-Apr. 2006, pp. 21-26.*

(Continued)

*Primary Examiner* — Jessee Roe
*Assistant Examiner* — John Hevey
(74) *Attorney, Agent, or Firm* — Morrison & Foerster LLP

(57) ABSTRACT

A copper alloy wire is a filamentary material of a copper alloy containing, in percent by mass, Ni: 3.0 to 15.0%, Al: 0.5 to 5.0%, and Si: 0.1 to 3.0%, with the remainder being composed of Cu and incidental impurities, which is provided with the tensile strength ($\sigma B$) of 900 to 1300 MPa and electrical conductivity of 10 to 22% IACS and, in addition to that property, satisfies an intensity ratio of A:B:C of 1.0:1.2 to 6.0:2.2 to 8.0 when A, B and C represent diffraction intensities of Cu (111), Cu (200) and Cu (220), respectively, according to an X-ray diffraction method in a predetermined cross section, and which is used for an operation or contact spring by incorporating in mobile phones and various small electronic instruments by formulating into a copper alloy spring used, particularly, for an electrical conductive spring.

2 Claims, 4 Drawing Sheets

(51) Int. Cl.
        C22C 9/01      (2006.01)
        F16F 1/02      (2006.01)
        C22C 9/06      (2006.01)

(56)                References Cited

U.S. PATENT DOCUMENTS

|  |  |  |  |  |
|---|---|---|---|---|
| 4,692,192 | A * | 9/1987 | Ikushima et al. | 148/554 |
| 6,406,566 | B1 * | 6/2002 | Ishida et al. | 148/402 |
| 2008/0047634 | A1 * | 2/2008 | Mihara et al. | 148/414 |
| 2008/0175746 | A1 * | 7/2008 | Era | C22C 9/06 420/485 |
| 2013/0333812 | A1 * | 12/2013 | Ishida et al. | 148/554 |

FOREIGN PATENT DOCUMENTS

| GB | 2 051 127 A | 1/1981 |
|---|---|---|
| JP | 58-107464 | 6/1983 |
| JP | 63-266033 | 11/1988 |
| JP | 3-126829 | 5/1991 |
| JP | 4-99140 | 3/1992 |
| JP | 7-268512 | 10/1995 |
| JP | 9-143596 | 6/1997 |
| JP | 2001-49369 | 2/2001 |
| JP | 2001-335864 | 12/2001 |
| JP | 2006-283107 | 10/2006 |
| JP | 2006-291271 | 10/2006 |
| JP | 2006-336068 | 12/2006 |
| JP | 2007-70651 | 3/2007 |
| JP | 2007-92135 | 4/2007 |
| JP | 2007-126739 | 5/2007 |
| JP | 2008-266787 | 11/2008 |
| JP | 2009-242921 | 10/2009 |
| JP | 2010-7174 | 1/2010 |
| JP | 2010-90408 | 4/2010 |

OTHER PUBLICATIONS

Rawlings, et al., "The alloying behavior and mechanical properties of polycrystalline Ni3Al (y' phase) with ternary additions," J. Materials Science, 10 (1975) pp. 505-514.*

International Search Report dated Mar. 19, 2012, directed to International Application No. PCT/JP2011/078769; 6 pages.

International Search Report and Written Opinion mailed Mar. 13, 2012, directed to International Application No. PCT/JP2011/078786; 6 pages.

Ishida et al., U.S. Office Action mailed Mar. 26, 2015, directed to U.S. Appl. No. 13/993,642; 12 pages.

Extended European Search Report dated Aug. 5, 2014, directed to EP Application No. 11849226.3; 8 pages.

Extended European Search Report dated Aug. 11, 2014, directed to EP Application No. 11848127.4; 14 pages.

Examination Report dated Mar. 6, 2015, directed to EP Application No. 11849226.3; 5 pages.

Examination Report dated Mar. 18, 2015, directed to EP Application No. 11848127.4; 5 pages.

Gryziecki, J. et al. (Dec. 2003). "The role of microadditions in the kinetic change of precipitation during the ageing process of nickel-aluminium bronze", *Archives of Metallurgy*, 48(3):245-259.

Materials Performance Group. (2014). "Mechanical Properties of Intermetallic Compounds Formed Between Tin (Solder) and Copper or Nickel—Hardness as a function of temperature for $Cu_6Sn_5$. $Cu_3Sn$. and $Ni_3Sn_4$," located at <http://www.msed.nist.gov/mechanical_properties/solder_mechanicalprop.html> visited on Jul. 23, 2014. (2 pages).

Zhu, Z-Y. et al. (Dec. 2007). "Solution and Ageing of Cu—Ni—Al—Si Alloy", *Jinshu Rechuli—Heat Treatment of Metals, Zhongguo Jixie Gongcheng Xuehui*, Beijing, CN, 32(4): 83-85. English translation of abstract provided.

Ishida et al., U.S. Office Action mailed Sep. 11, 2015, directed to U.S. Appl. No. 13/993,642; 12 pages.

Summons to attend oral proceedings pursuant to Rule 115(1) EPC dated Oct. 19, 2015, directed to EP Application No. 11849226.3; 8 pages.

Written Submissions dated Dec. 18, 2015, directed to EP Application No. 11849226.3; 26 pages.

Result of consultation dated Jan. 14, 2016, directed to EP Application No. 11849226.3; 2 pages.

Amendments to the claims and description and drawings dated Jan. 20, 2016, directed to EP Application No. 11849226.3; 102 pages.

Ishida et al., U.S. Office action mailed Dec. 2, 2015, directed to U.S. Appl. No. 13/993,642; 4 pages.

Ishida et al., U.S. Office action mailed Apr. 21, 2016, directed to U.S. Appl. No. 13/993,642; 11 pages.

* cited by examiner

COPPER ALLOY WIRE AND COPPER ALLOY SPRING

REFERENCE TO RELATED APPLICATIONS

This application is a national stage application under 35 USC 371 of International Application No. PCT/JP2011/078769, filed Dec. 13, 2011, which claims the priority of Japanese Patent Application No. 2010-276609, filed Dec. 13, 2010, the entire contents of which are incorporated herein by reference.

FIELD OF THE INVENTION

The present invention relates to a copper alloy wire which is incorporated in mobile phones and various small electronic instruments, used as an operation or contact spring, and copes with electrical conductivity and spring property, particularly, heat sagging property accompanied with heat generation at energization, and a copper alloy spring.

BACKGROUND OF THE INVENTION

Since copper and a copper alloy material are small in an electric resistance, and are excellent in electrical conductivity, they are expected in development on electric and electronic materials, and parts such as a connector, and a contact spring of mobile phones and various electronic instruments which are rapidly technically innovated continuously, and a beryllium copper alloy wire rod (e.g. JIS-H3270) has been conventionally used frequently.

However, since the beryllium copper alloy contains harmful beryllium in a composition thereof, and there is an environmental problem when this is recycled, use thereof has been being limited in recent years, and in the light of such the circumstances, the present applicant provided a copper silver alloy wire having both high strength property and electrical conductivity property due to the combined effect of a eutectic phase of Cu and Ag and $Ni_2Si$ particles, by inclusion Ag: 5.0 to 16.0%, Ni: 1.0 to 5.0%, and Si: 0.2 to 1.2% (see Patent Literature 1).

On the other hand, Patent Literature 2 discloses a copper alloy containing Ni: 1.5 to 4 mass %, Si: 0.30 to 1.2 mass % and a total of 0.03 to 0.5 mass % of one or two of Mn and Mg, with the remainder being composed of Cu and incidental impurities, in which a mass concentration ratio of Ni and Si (Ni/Si ratio) in the alloy composition is in a range of 4≤{Ni/Si}≤5, and discloses a Cu—Ni—Si copper alloy for electronic materials, in which, among the copper alloy, a size of an intercalator is 5 μm or less, a total of Ni, Si and oxygen concentrations in the intercalator is 10 mass % or more, and a ratio of the number of intercalators having a size of 1 μm or more and the total number of intercalators having a size of 0.1 μm or more is 0.1 or less.

Patent Literature 1: JP-A-2006-291271
Patent Literature 2: JP-A-2006-283107

SUMMARY OF THE INVENTION

However, the copper silver alloy wire of Patent Literature 1 contains expensive Ag in its component composition, increase in the material price prevents diffusion and expansion of selling, the sagging property is property in the so-called de-energized current state, that is, in the case where use in the normal temperature state is premised, and in actual use, a wire rod itself generates heat due to electric current flowing in a wire, and it is feared that this heat reduces mechanical property of a wire rod, particularly, a spring-generating force and sagging life property. Therefore, Patent Literature 1 does not consider change in property in such the heated state, and has a problem in a spring-generating force and sagging life property.

Further, the Cu—Ni—Si copper alloy of Patent Literature 2 is directed to those used in electronic parts such as a lead frame, a connector, a pin, a terminal, a relay, a switch and the like, alleviating influence of such the heat, and is excellent in electrical conductivity, but is low in the strength, and does not consider use in spring products having suitability for use in a spring, that is, having both of electrical conductivity and elastic spring property in the heated state, and there is a problem in a spring-generating force or the like.

An object of the present invention is to solve the problems of such the conventional copper alloy material, and provide a copper alloy wire and a copper alloy spring for a heat sagging dealing-type electrically conductive spring, which particularly improves heat sagging property in the heated state upon use and, at the same time, has the high strength, is excellent in electrical conductivity, and suppresses environmentally harmful elements.

In order to solve the aforementioned problems, the copper alloy wire of the present invention is a filamentary material of a copper alloy containing, in percent by mass, Ni: 3.0 to 15.0%, Al: 0.5 to 5.0%, and Si: 0.1 to 3.0%, with the remainder being composed of Cu and incidental impurities, in which the filamentary material is provided with a tensile strength (σB) of 900 to 1300 MPa, and electric conductivity of 10 to 22% IACS, or a filamentary material of a copper alloy containing, in percent by mass, Ni: 3.0 to 15.0%, Al: 0.5 to 5.0%, and Si: 0.1 to 3.0%, with the remainder being composed of Cu and incidental impurities, in which the filamentary material is provided with a tensile strength (σB) of 900 to 1300 MPa, and electrical conductivity of 10 to 22% IACS, and a diffraction intensity ratio of A:B:C satisfies 1.0:1.2 to 6.0:2.2 to 8.0, when A represents a diffraction intensity of Cu (111), B represents a diffraction intensity of Cu (200), and C represents a diffraction intensity of Cu (220) according to an X-ray diffraction method in a predetermined cross section.

Further, the copper alloy wire of the present invention is further characterized in that the diffraction intensity ratio satisfies 1.0:1.4 to 4.0:2.8 to 5.0.

Further, the copper alloy wire of the present invention is further characterized in that a proof stress ratio (σ0.2/σB) of the tensile strength relative to a 0.2% proof stress (σ0.2) is 68 to 85%.

Further, the copper alloy wire of the present invention is further characterized in that the Ni, the Al and the Si are such that a relational ratio A value according to {(Ni+20Al)/8Si} is 5 to 13.

Further, the copper alloy wire of the present invention is further characterized in that the copper alloy contains, in percent by mass, any one or two or more of B: 0.001 to 0.050%, P: 0.01 to 0.30%, Ti: 0.1 to 0.8%, Co: 0.1 to 0.8%, Cr: 0.1 to 0.8%, Zn: 0.3 to 1.2%, Sn: 0.1 to 1.0% and Fe: 0.01 to 1.0%.

Further, the copper alloy wire of the present invention is further characterized in that the copper alloy is a precipitation hardening-type copper alloy, in which an intermetallic compound of any of a γ' phase of $Ni_3(Al, Si)$, $Ni_2(Al, Si)$ and $Ni_5Si_2$ is formed in its parent phase by aging treatment.

Further, the copper alloy wire of the present invention is further characterized in that the copper alloy has been cold processed, and has a fibrous texture having a crystal particle diameter of a transverse cross section thereof of 5 μm or less.

Further, the copper alloy spring in the present invention is a copper alloy spring having a predetermined spring shape due to a copper alloy wire, which uses the copper alloy wire, and has electrical conductivity of 12% IACS or more, and a residual shearing strain of 0.15% or less when heated to a temperature of 125° C. and held for 1 week in the state where a stress of 400 N/mm² is loaded.

Further, the copper alloy spring of the present invention is further characterized in that an intermetallic compound of any of a γ' phase of $Ni_3$(Al, Si), $Ni_2$(Al, Si) and $Ni_5Si_2$ is formed alone or complexly in a parent phase of the copper alloy.

Further, the copper alloy spring of the present invention is further characterized in that the intermetallic compound has an average particle diameter of 4 μm or less, and an occupying area rate in a range of 0.05 to 30%.

Further, the copper alloy spring of the present invention is further characterized in that the copper alloy spring has been subjected to heat treatment of rapid cooling-treating the spring at a cooling rate of 30° C./sec or more after heating in a range of a heating temperature of 250 to 550° C. for 30 hours or shorter.

According to the copper alloy of the present invention, use of expensive Ag is suppressed, and heat sagging property accompanied with heating upon use is improved by high strength property as a spring due to hardening of precipitation of Ni and/or Al compounds, and miniaturization of a crystal grain thereof and, further, the copper alloy of the present invention has the excellent industrial effect as a copper alloy wire for an electrically conductive spring excellent in the mechanical strength and electrical conductive property.

In addition, a material composition thereof does not contain harmful Be and very expensive Ag as conventionally, the copper alloy of the present invention can lead to expansion and diffusion as an ecological material undertaking to save the cost, and the aforementioned properties can be more improved to realize a long life and expansion of utility development.

On the other hand, according to the copper alloy spring of the present invention, a spring is formed of the copper alloy fine wire excellent in mechanical property and electrical conductive property, a residual shearing strain is suppressed to improve property on heat sagging and, further, by forming an intermetallic compound in a parent phase thereof, stable use is realized over a long term, and diffusion and expansion become possible as an efficient spring product having a long life.

DETAILED DESCRIPTION OF THE INVENTION

Figure 1:
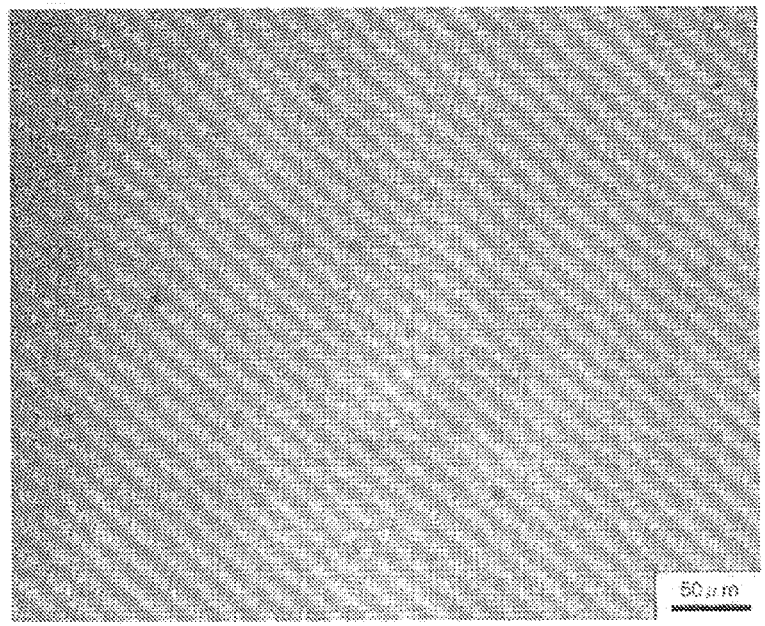
FIG. 1 is one example of a microscopic photograph explaining an intermetallic compound.

A preferable embodiment of the present invention will be explained below, and in the present invention, except for the case where particularly instructed, a unit "%" of a content of each constituent element means "mass %".

The copper alloy wire of the present invention is a copper alloy wire containing Ni: 3.0 to 15.0%, Al: 0.5 to 5.0%, and Si: 0.1 to 3.0% as a constituent element thereof, with the remainder being composed of Cu and incidental impurities, which is provided with a tensile strength (σB) of 900 to 1300 MPa and electrical conductivity of 10 to 22% IACS, and the invention of claim 2 contains Ni: 3.0 to 15.0%, Al: 0.5 to 5.0%, and Si: 0.1 to 3.0% as a constituent element thereof, with the remainder being composed of Cu and incidental impurities, which is provided with a tensile strength (σB) of 900 to 1300 MPa and electrical conductivity of 10 to 22% IACS, and a diffraction intensity ratio of A:B:C satisfies 1.0:1.2 to 6.0:2.2 to 8.0, when A represents a diffraction intensity of Cu (111), B represents a diffraction intensity of Cu (200), and C represents a diffraction intensity of Cu (220) according to an X-ray diffraction method in a predetermined cross section.

Like this, a structure having a diffraction intensity ratio of 1.0:1.2 to 6.0:2.2 to 8.0 results in a fine fibrous crystal structure which extends in a longitudinal direction thereof, for example, by high cold wire drawing, thereby, improvement in the property of the copper alloy wire is promoted such that a tensile strength (σB) is 900 to 1300 MPa, and electrical conductivity is 10 to 22% IACS.

A cross-sectional shape and a dimension of the alloy wire are not particularly limited, but can be variously set depending on the use purpose and utility, a disposition space and the like. For example, in use as an electrically conductive spring of electronic instruments, a wire of a relatively fine diameter to an extent of a wire diameter of 0.05 to 5.0 mm, preferably a wire diameter of 0.1 to 3.0 mm is used frequently, but depending on utility, a bar of a great diameter exceeding this is also included, and a filamentary material having, as a cross-sectional shape thereof, a non-circular shape such as an elliptic shape, a belt shape, a square shape, and other various irregular shapes in addition to a round wire shape is also included. In the present invention, similarly, the belt wire and the square wire also include within a range thereof a relatively wide bar having a width dimension of, for example, over 30 mm.

Like this, since the present invention is also directed to various non-circular shaped wire filamentary materials, regarding wire diameter indication in that case, for example, an equivalent wire diameter (d) calculated from a cross section area of an arbitrary transverse section of the alloy wire can be used.

In addition, a component composition thereof contains constituent elements of the predetermined amounts of Ni, Al and Si and the remainder of Cu, and a small amount of incidental impurities are allowed to be contained. These constituent elements result in the desired property by precipitation of any intermetallic compound of, for example, a γ' phase of $Ni_3$(Al, Si), $Ni_2$(Al, Si) and/or $Ni_5Si_2$ alone or in the mixed state in a matrix thereof by joint addition of the Ni, the Al and the Si, for example, by precipitation hardening treatment (also referred to as aging treatment) which is arbitrarily performed thereafter, and since these compounds are fine and hard, and also influence on the electrical conductivity property, they are suitable for the present invention. That is, these compounds further include complex formation of any compound of the $Ni_2(Al, Si)$ and the $Ni_5Si_2$ in addition to precipitation of the γ' phase or the like alone, and a mixing ratio is not particularly defined.

Usually, these compounds are fine, but are heterogeneous, being harder than a parent material matrix, and when volumetric ratio of entirety thereof is enhanced more than necessary, mechanical property is influenced by a structural factor. Further, also regarding a particle diameter, when an equivalent wire diameter in the final product state is of a fine diameter dimension, for example, 1 mm or less, in the case of precipitation in the large state exceeding a particle diameter 10 μm therein, since the total strength as an alloy wire is reduced, it is preferable to adjust a particle diameter and a distribution amount of precipitated compounds, including such the point and, for example, appropriate adjustment of a component composition of an alloy wire and the precipitation treatment condition is desired.

For example, when the compound is the γ', a size (average particle diameter) thereof is, for example, 4.0 μm or less, preferably 0.5 μm or less, further preferably 0.1 μm or less and, for example, extreme miniaturization in a range of 5 to 80 nm is preferable. As treatment thereof, for example, after solution treatment and cold working, aging treatment can be further performed in a temperature range of around 400 to 650° C. for a relatively long time in a range of around 0.1 to 48 hours. For example, a heating temperature and a time result in increase in a precipitation amount and a particle diameter of compounds to be formed. Also regarding other compounds, similarly, appropriate adjustment of a compositional ratio of constituent elements of a material, and the processing treatment condition, particularly, the heat treatment condition is performed so that a particle diameter thereof is preferably 10.0 μm or less, preferably 4.0 μm or less.

Since the thus precipitated compound is very hard, and also contributes to improvement in electrical conductivity, uniform distribution of such the fine hard γ' phase or the like enhances the total strength of a copper alloy wire, and brings about the pinning compound for heat sagging or the like, becoming excellent in electrical conductivity. A distribution amount of these compounds is expressed by an area ratio occupied in an arbitrary observation plane of the alloy wire, and the area ratio is, for example, 0.05 to 30%, and in the case of the alloy wire of the aforementioned fine diameter, the area ratio is, for example, 0.1 to 5%, preferably 0.3 to 2%. In addition, in the case of the complex formation, it is preferable that the complex is provided with more the γ' compound than the $Ni_2(Al, Si)$ and the $Ni_5Si_2$ compound by comparison of the number.

As an alloy composition promoting more the effect of precipitation of these compounds, the aforementioned copper alloy containing Ni: 3.0 to 15.0%, Al: 0.5 to 5.0%, and Si: 0.1 to 3.0% is adopted. Among it, by making a relational ratio A value according to {(Ni+20Al)/8Si} 5 to 13, formation of the more optimal aforementioned compound is realized, and a copper alloy wire which is more improved in the high strength and high electrical conductivity, as well as heat sagging property is obtained.

Herein, to further explain the γ' phase, Ni, Al and Si bring out precipitation of an intermetallic compound such as $Ni_3Al$ and $Ni_3Si$ in Cu of a parent phase, and due to component balance between Al and Si, not $Ni_3Al$ or $Ni_3Si$ alone, but an intermetallic compound $Ni_3(Al, Si)$ is formed while being mixed in a corner of the FCC structure in the $L1_2$ type.

Figure 5:
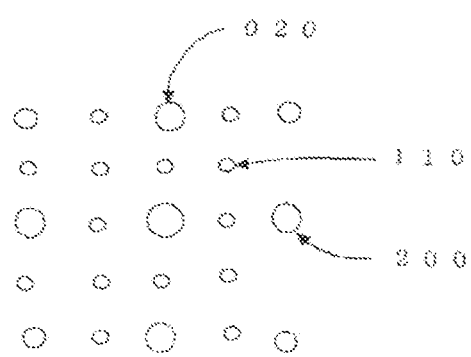
FIG. 5 is a schematic view illustrating a metal crystal structure $L1_2$ by electron beam diffraction

FIG. 5 is a schematic view explaining a metal crystal structure $L1_2$ by electron beam diffraction.

The $L1_2$ structure can be confirmed, for example, by an arrangement structure of an electron beam diffraction image by X-ray, directing to a regular phase having a diffraction plane 110, for example, as in FIG. 5. That is, the γ' phase is an intermetallic compound, and is of the regularized FCC structure in which an atom positioning at a corner is Al and Si, and an atom positioning on a face center is Ni.

Since these copper of a parent phase having the FCC structure and γ' phase having the $L1_2$ structure are, both, of the FCC structure, they are good in integrity, contribute to improvement in the strength and, at the same time, a solute element concentration of a parent phase is decreased by precipitation of the γ' phase and, thus, they also contribute to improvement in electrical conductivity.

Further, the γ' phase of the $L1_2$ structure belongs to the GCP (Geometrically close packing) phase, and has ductility due to its closed packing structure and, further, since integrity is high, in the γ+γ' structure being a fine structure, a copper alloy having high workability with toughness can be obtained.

This γ phase shows a metal structure having the FCC structure in a parent phase of a copper alloy.

In addition, by controlling its average particle diameter small, it is possible to further improve the strength. By reducing an average particle diameter of the γ' phase, a pinning site of moving rearrangement is formed, and the high tensile strength can be obtained.

Further, the γ' phase is an intermetallic compound, its own hardness is high, and the tensile strength is also high. Therefore, prevention of movement of rearrangement in the γ' phase contributes to the hardness and the tensile strength of a copper alloy.

In addition, electrical conductivity is generally more reduced as a concentration of a solute element which forms a solid solution in copper is higher, and since a solute element concentration of a parent phase is decreased as compared with the solution state of the γ monophase by precipitating the γ' phase by heat treatment at a low temperature, precipitation of the γ' phase also contributes to improvement in electrical conductivity. In addition, since electrical conductivity of the γ' phase is lower than electrical conductivity of pure Cu, movement of electrons is reduced by a portion corresponding to a ratio of a volume occupied by this γ' phase, but high electrical conductivity can be maintained by realizing a volumetric fraction of a suitable amount of the γ' phase.

Therefore, when formulated into a copper alloy, contribution to mechanical property such as the hardness, the tensile strength and the like is great without greatly deteriorating ductility such as cold workability and the like, and as a second phase having the effect of improving electrical conductivity, the γ' phase is suitable.

In addition, thereupon, an intermetallic compound other than the γ' phase such as $Ni_3Al$, $Ni_2(Si, Al)$ and $Ni_5Si_2$ are precipitated in some cases, depending on amounts of added Ni, Al and Si, and the treatment condition. However, since the property thereof is coarser than that of the γ' phase, formation more than necessity is not preferable, and it is desired that they are present in admixture in such the range that a mechanical nature and the heat sagging property of a copper alloy wire are improved. Verification of these compounds can be performed, for example, by EPMA analysis or EDX analysis.

In addition, the β phase forming a solid solution of Ni, Al and Si is precipitated in some cases. This β phase is of the BCC structure, but has a narrow compositional range within which β phase precipitates, and if β phase precipitates, an amount thereof is limiting, and influence on a mechanical nature and an electric nature of a copper alloy is also small.

By these compounds, a spring product is provided with predetermined electrical conductivity and high strength property and, at the same time, a residual shearing strain concerning spring property is improved, leading to improvement in performance on heat sagging.

Assessment of whether a spring product which is a subject of the present invention satisfies such the property, particularly, spring property and the heat sagging performance as a spring of the high strength and electrical conductivity or not is performed, for example, by whether a residual shearing strain amount under stress loading of 400 MPa accomplishes 0.15% or less in the environmental atmosphere of a temperature of 125° C. or not, in view of the use state.

It is preferable that a copper alloy wire leading to this property is provided with a texture having at least the tensile strength (σB) of 900 to 1300 MPa and the aforementioned strength ratio measured by an X-ray diffraction method, and it is desired that the electrical conductivity is 10 to 22% IACS.

For this reason, the copper alloy wire is adjusted to the aforementioned each composition, Ni precipitates an intermetallic compound such as the γ' phase and the like which precipitates by joint addition of Si as described above, and the strength necessary as a spring product can be imparted. When a content thereof is less than 3.0%, sufficient formation of the aforementioned compounds is not obtained, and it is difficult to accomplish necessary mechanical property such as spring property. Further, even when a large amount exceeding 15.0% is contained, the effect thereof is saturated and, conversely, not only reduction in corrosion resistance and a production yield due to increase in formation of the compounds is resulted, but also since Ni is expensive, the large amount also becomes a factor of the cost up. Therefore, the amount is 3.0 to 15.0%, preferably 5.0 to 13.0%, further preferably 5.5 to 10.0%.

Further, since Al leads to increase in a 0.2% proof stress in the alloy wire, and can enhance a spring-generating force as a wire rod for a spring, an amount thereof is set at 0.5 to 5.0%. That is, when a content thereof is less than 0.5%, sufficient precipitation of the aforementioned compounds is not realized, and it is difficult to satisfy the strength and the heat sagging property. Conversely, when the content exceeds 5.0%, since workability as a fine diameter wire rod is reduced, and the cost up due to reduction in a yield is resulted, the content is more preferably 0.6 to 3.0%, further preferably 0.8 to 2.0%.

Further, the Si is an element which functions in formation of a compound with the Ni and the Al, and improves the strength property thereof and, on the other hand, also has the effect of enhancing hot workability, and an addition amount thereof is set in the aforementioned predetermined range. When the addition amount is less than 0.1%, the effect thereof is not sufficient, and addition at a large amount exceeding 3.0% reduces workability in hot working and cold working, and also influences on electrical conductivity. From such the view point, in the present invention, the addition amount thereof is 0.1 to 3.0%, preferably 0.3% or more, 0.3 to 1.2%, further preferably 0.4 to 1.0%.

Further, for enhancing the property more, it is also preferable that a relational ratio A value according to {(Ni+20Al)/8Si} of Ni, Al and Si is 5 to 13. Thereby, precipitation and generation of the compounds are made to be good, and necessary property such as electrical conductivity and crystal miniaturization is further improved, and the more preferable A value is 7 to 11.8%.

The copper alloy wire of the present invention is composed of such the fundamental composition and the remainder of substantially Cu, and a small amount of other incidental impurities are allowed to be contained and, if necessary, for example, the following third element can be also further added.

As a preferable third element, there are, for example, B: 0.001 to 0.050% (more preferably 0.003 to 0.030%), P: 0.01 to 0.30%, Ti: 0.1 to 0.8%, Co: 0.1 to 0.8%, Cr: 0.1 to 0.8%, Zn: 0.3 to 1.2%, Sn: 0.1 to 1.0% or Fe: 0.01 to 1.0%, and it can be shown that any one or two or more of them are contained. Among them, particularly, Ti, Co and Cr promote generation of a precipitated compound, B and Fe enhance the total strength of the alloy wire, Sn and Zn enhance electrical conductivity, and P removes oxygen (O) as the impurity and, additionally, enhances the total strength of the alloy wire and, thus, results in the effect of improving the strength and heat resistance. Particularly, the copper alloy wire with B, Ti, Sn and Zn added thereto has the more efficient effect. A total amount of these third elements is preferably 5% or less.

Examples of the incidental impurities include oxygen (O), sulfur (S) and hydrogen (H). Particularly, oxygen generates an oxide, deteriorates workability of fine diameter working and, additionally, results in reduction in corrosion resistance and the electrical conductivity, and S or the like forms a harmful coarse intercalator and, therefore, it is preferable to suppress each of them to 0.1% or less, and adjust a total of them at 0.20% or less. Particularly, since inclusion of oxygen forms an oxidized film on a surface to increase discoloration and a contact resistance, and further reduce solder wettability, it is desired that inclusion of oxygen is suppressed as much as possible, and more preferably, 0.10% or less is desired. Further, inclusion of sulfur and hydrogen forms a coarse intercalator, and it is feared that property and workability of an alloy wire are reduced. By regulation of these impurities, for example, reduction in corrosion resistance, electrical conductivity and mechanical property is suppressed.

The γ' compound is a very fine and hard particle having a particle diameter of, for example, around 4.0 μm or less, as explained above, and by widely distributing this in a matrix thereof, the pinning effect of blocking an external stress such as loaded deformation not accompanying with use can be exerted, and it becomes possible to improve property of spring property and heat sagging property.

FIG. 1 is a reference view for explaining the state of formation of these intermetallic compounds, and is one example of a microscopic structure in which the γ' phase and the $Ni_5Si$ compound are precipitated in its parent phase matrix by aging-treating a copper alloy wire of the aforementioned composition which has been solution heat-treated, under 350° C.×24 Hr. Herein, since the γ' phase is very fine particle, $Ni_5Si$ is substantially seen. That is, the γ' phase is measured at further higher magnification, but a form is similar.

Therefore, an average particle diameter when such the fine particle having a non-circular cross section is contained, will be expressed, for example, by an average obtained by averaging sizes of one group of respective compound particles. Measurement is indicated by a rod average obtained, for example, by selecting compounds having a greater size, for example, 10 or more compounds among the compounds confirmed in the measurement field of structure observation with an electron microscope, and further averaging individual average diameters (an average of a maximum dimension of the compound measured on a cross section and a minimum dimension in a direction orthogonal therewith). Further, from a statistical point of view, observation is more preferably performed in a few fields which are arbitrary selected.

Herein, the reason why the 10 or more extracted particles are used, is that this measurement is performed persistently on a specified cross section, measurement is simplified, and a better average particle diameter is shown.

Further, an area ratio occupied by it is indicated by a distribution ratio obtained by dividing a total area of the compounds present in its measurement field with its field area by image analysis by similar structure observation, more preferably, observation is performed in a few measurement fields, and it is preferable that an area ratio is the aforementioned area ratio.

Like this, since a compound particle of particularly the γ' is of a fine shape and is hard, it exerts the pinning effect of cross slippage accompanied with stress addition upon use thereof, due to distribution of it in a matrix, and improves the strength and heat sagging property while suppressing decrease in electrical conductivity. The aforementioned compounds other than the γ' phase bring about the approximately similar property, but do not exceed the γ' phase in respect of the effect.

The copper alloy wire for bringing about such the property is such that the wire is provided with aforementioned composition, and the tensile strength (σB) is 900 to 1300 MPa, and a ratio of the diffraction intensity in an X-ray diffraction method has the following range, wherein when A represents a diffraction intensity of Cu (111), B represents a diffraction intensity of Cu (200) and C represents a diffraction intensity of Cu (220), a diffraction intensity ratio of A:B:C satisfies 1.0:1.2 to 6.0:2.2 to 8.0.

Figure 2A:
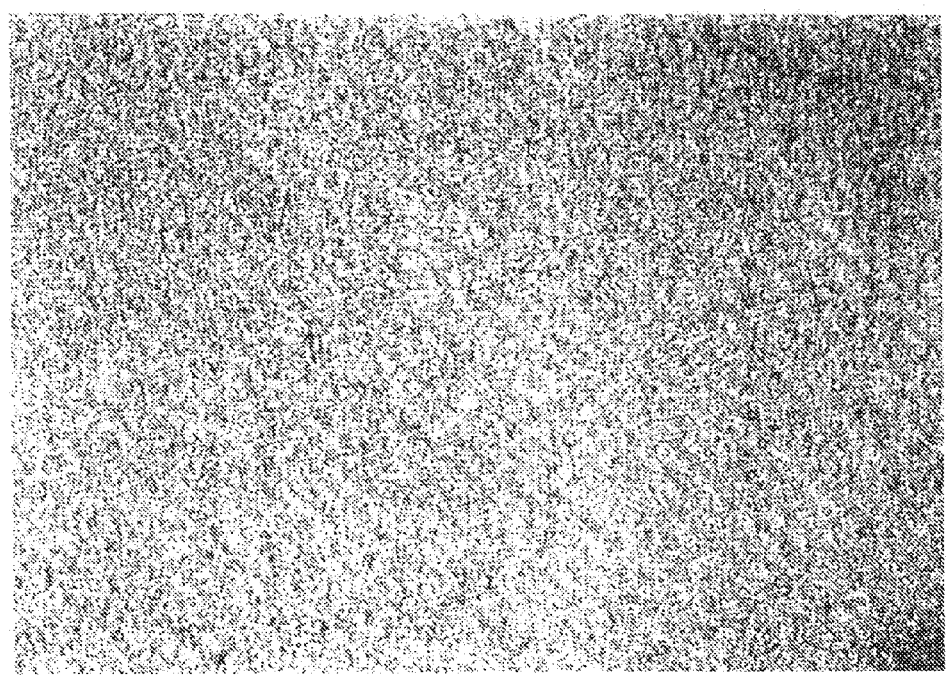
FIG. 2A is a microscopic photograph showing a texture of the copper alloy wire of the present invention, indicating a transverse section thereof.
Figure 2B:
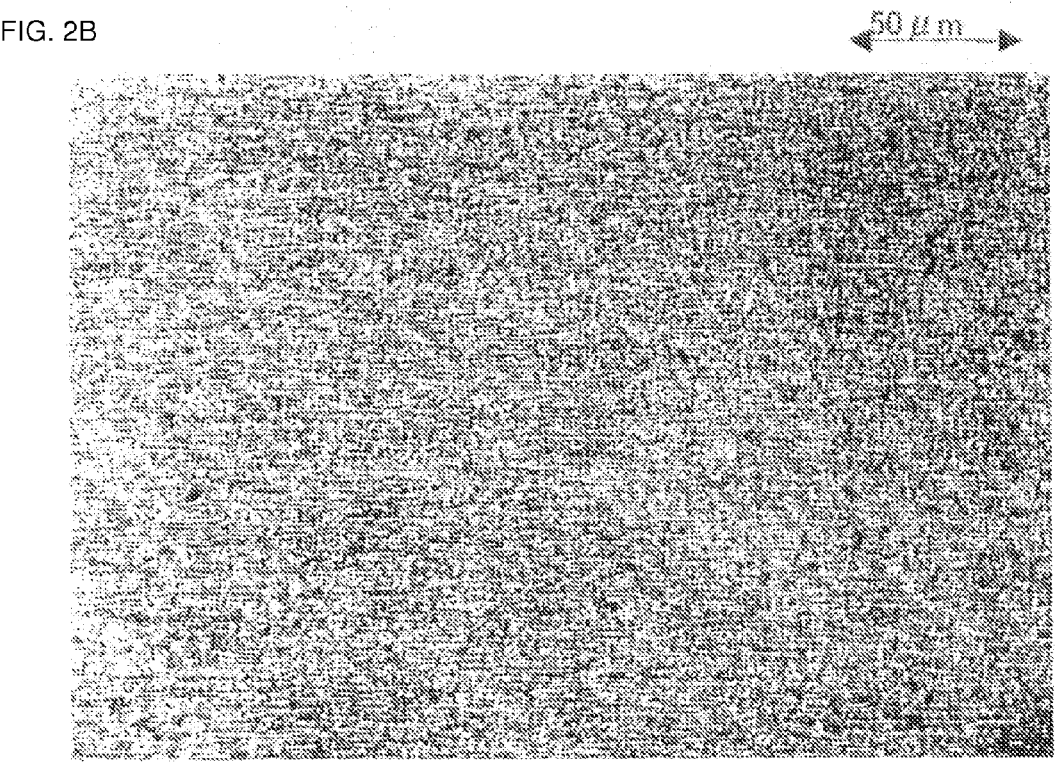
FIG. 2B is a microscopic photograph showing a texture of the copper alloy wire of the present invention, indicating a longitudinal section.

That is, when the alloy wire is used for an electrical conductive spring, the alloy wire is subjected to cold working by die drawing, for example, at a predetermined working ratio and, accompanying therewith, its crystal structure becomes to have a texture in which crystal directions are uniform in the drawing direction. By optimizing the texture, the structure state of the FCC structure can be enhanced and stabilized, and one embodiment of the structure is shown by each microscopic photograph of a transverse section of FIG. 2A and a longitudinal section of FIG. 2B.

One embodiment of the present invention improves suitability as a spring product by cooperation of such the texture and the aforementioned compounds, and the intensity ratio based on X-ray diffraction is shown by an intensity peak of each crystal spectrum. That is, the Cu (111) means a peak intensity at a diffraction plane of a (111) plane in the same diffraction, similarly, the Cu (200) means a peak intensity of a diffraction plane of a (200) plane in the same diffraction and, further, the Cu (220) means a peak intensity of a diffraction plane of a (220) plane in the same diffraction.

Measurement thereof is performed on an arbitrary predetermined cross section (e.g. longitudinal section) of alloy wire, and as a radiation source of an X-ray used, for example, Co-Kα is selected.

Further, according to further study by the present inventors, at the intensity ratio A:B:C of, particularly, 1.0:1.4 to 4.0:2.8 to 5.0, the effect can be maximally exerted, and it has been confirmed that the above intensity ratio is also preferable from a viewpoint of a fatigue life. Further, a copper alloy wire of such the intensity ratio is also suitable for a coil spring of a severe shape such as a ratio (D/d) of a wire diameter d of an alloy wire relative to a coil average diameter D of 5 or less and, additionally, particularly, a longer life is required. For example, the copper alloy wire can be frequently used in a variety of utilities in which the high strength and high electrical conductivity are required, as electronic instruments such as a straight fine wire-like spring used for suspension of optical pickup, and other various pins.

Further, in order to obtain a copper alloy wire having a texture of the aforementioned intensity ratio, one can cope therewith by selection of the aforementioned component composition as well as a drawing working ratio and a lubricant which are the working condition, and adjustment between a heat treatment temperature and a time, and it is desired that they are confirmed by a preliminary test prior to implementation.

The tensile strength of a copper alloy wire is measured, for example, according to JIS-Z2241. In the case of property of less than 900 MPa, even when the strength is increased by spring formation and aging treatment thereof, it is difficult to obtain the sufficient effect, and it is difficult to expect the property required for a spring. Conversely, when the tensile strength is enhanced so as to exceed 1300 MPa, the strength is imparted by working therefor, and it is difficult to satisfy stabilization of a coil spring shape, and fatigue property, due to an internal residual strain. Therefore, more preferable strength property is 950 to 1250 MPa, further preferably, it is desirable that a 0.2% proof stress is 68 to 85% of the tensile strength, and this relationship is usually expressed as a proof stress ratio.

As the proof stress ratio is greater in a value, elastic property is more excellent, and the proof stress ratio is also supported as the effect on spring property, particularly, heat sagging due to generated heat upon use as described above. Further preferably, it is desired that the alloy wire is of a finer structure in which a size of a crystal particle on its transverse section is 5 μm or less, particularly, 3 μm or less, by cold working explained below.

A copper alloy wire provided with the aforementioned mechanical strength and X-ray diffraction intensity ratio is subjected to high deformation at a working ratio of 80% or more after solution heat treatment, for example, at a temperature of 800 to 1000° C., and high deformation is preferably performed in a range of 90 to 99.8%. As this working, for example, continuous cold wire drawing working and cold rolling working are adopted. In that case, in wire drawing working, a shape of a die for wire drawing working and pass schedule become one of variation factors influencing on the property, in some cases.

Particularly, it is desired that a low angle die having an approach angle of a die of 12° or less is adopted, and a pressure die is used, or a working degree between respective working dies is set to be reduction in area of 17% or less.

Since the copper wire alloy of the present invention is directed to utility of the suspension spring and other various electrically conductive springs, it is defined that the copper alloy wire has electrical conductivity of 10% IACS or more, preferably 10.5 to 22% IACS as electrical property thereof, and measurement is possible by a 4 terminals method in a constant temperature tank at 20° C. (sample length 100 mm) in accordance with, for example, JIS-C3002 "Method of testing a copper wire and an aluminum wire for electricity".

A kind, a shape and a size of the copper alloy spring of the present invention can be arbitrarily selected depending on the purpose thereof, and can be variously set as a disk spring in addition to a coil spring, a torsion spring, a torsional spring and the like, and since finally the precipitation hardening function is utilized, and for producing it, after the copper alloy wire which has been reduced in a diameter is fabricated into a predetermined spring shape, precipitation hardening treatment at a temperature of 250 to 550° C. and a range of a treatment time of 30 Hr or shorter (e.g. 0.1 to 10 Hr in a small shaped spring product) is performed. On the other hand, when a product to be treated is, for example, a continuous alloy wire for a straight spring, it is preferable that continuous heating of an in-line heating system is used, and heat treatment is performed while a stress of a 0.2% proof stress value or less of the wire, that is, a reverse tensile force is added. Thereby, true straightness of a wire is obtained at the same time, and step shortening can be realized. In addition, a heating time in the case of such the continuous heating is different depending on a wire diameter of the wire and required property, but for example, in a fine wire rod having a wire diameter of 0.05 to 3 mm, heat treatment for a short time of around 1 second to 10 minutes is recommended.

In such the case, from a view point of the mass effect of the product to be treated itself, as precipitation aging treatment in the case of (a) a continuous wire rod such as the aforementioned continuous fine wire, and (b) a shaped formed product such as a coil spring, it is preferable that the treatment is such that conditional values (Y and Y1) obtained by the following equations are set at 100 to 900, preferably 150 to 400 within the condition of the aforementioned temperature range, respectively, depending on a form of the product to be treated.

Continuous wire rod: $Y=\{\text{heating temperature (° C.)} \times \text{heating time (min)}\}/\sqrt{\{\text{equivalent wire diameter } d \text{ (mm)}\}}$ Shaped formed product: $Y1=\{\text{heating temperature (° C.)} \times \text{heating time (min)}\}/2\sqrt{\{\text{equivalent wire diameter } d \times \text{deployed length } L \text{ (mm)}\}}$ (* "Deployed length L" means a length of an alloy wire constituting the shapes product, that is, a length when this is deployed straight and elongated.)

By such the hardening treatment, precipitation of the aforementioned compounds in a matrix of the copper alloy wire is realized, and material property is improved.

Further, desirably, it is preferable that by performing heating in the solution treatment and the aging treatment, for example, in the oxidation-free atmosphere of an argon gas or an AX gas of a high purity having a dew point of −80° C. or lower and, at the same time, in the aging treatment, performing rapid cooling treatment at a cooling rate of 30° C./sec or more, preferably 80° C./sec or more in a temperature range of 250 to 550° C., miniaturization of a precipitated compound, and formation of a distribution amount are promoted and, at the same time, generation of an oxidized film on an alloy wire surface is suppressed to improve corrosion resistance.

If necessary, a so-called two stage aging treatment can be also performed, in which after the aging treatment, second time aging treatment of performing heating at a lower temperature is further added. According to this two stage aging treatment, in addition to a compound having a certain particle diameter formed by first stage aging treatment, a more miniaturized fine particle compound is complexly formed and, as a whole, electrical conductivity together with strength property can be more improved. This second stage aging treatment can be freely set, for example, in a range of a temperature of 200 to 400° C.

The thus obtained spring product of the present invention, by the aforementioned aging treatment, precipitates a precipitate such as predetermined γ' in a parent material matrix to more enhance electrical conductivity, resulting in electrical conductivity of 12% IACS or more (e.g. 12 to 25% IACS) together with high strength property which are preferable as an electrically conductive spring product. Further, regarding the heat sagging accompanied with heating upon use thereof, good improvement is realized, and as an assessment matter thereof, a residual shearing strain amount under predetermined condition is shown. The condition is that stress of 400 MPa is loaded to a test spring product in the heating atmosphere at a temperature of 125° C., and a residual shearing strain after passage of one week is 0.15% or less.

The residual shearing strain is, for example, such that a weight loss in the aforementioned heat sagging test is converted into a loss of a torsion stress applied to a wire rod thereupon, and this value is divided with a transverse elastic coefficient of a wire and expressed by a percentage, and as this numerical value is smaller, it is meant that heat sagging is generated with more difficulty, and the residual shearing strain can be obtained by a calculating equation shown in the following equation.

Residual shearing strain ratio=$\{8\Delta PD/\pi d^3 G\}\times 100$ wherein, ΔP: weight loss (N) according to the following equation

*{(loaded weight at test−repulsion force at completion of test)/loaded weight at test}×100

D: Central diameter of spring (mm)
d: Diameter of wire rod (mm)
G: Transverse elastic coefficient of wire rod (MPa)

Figure 3:
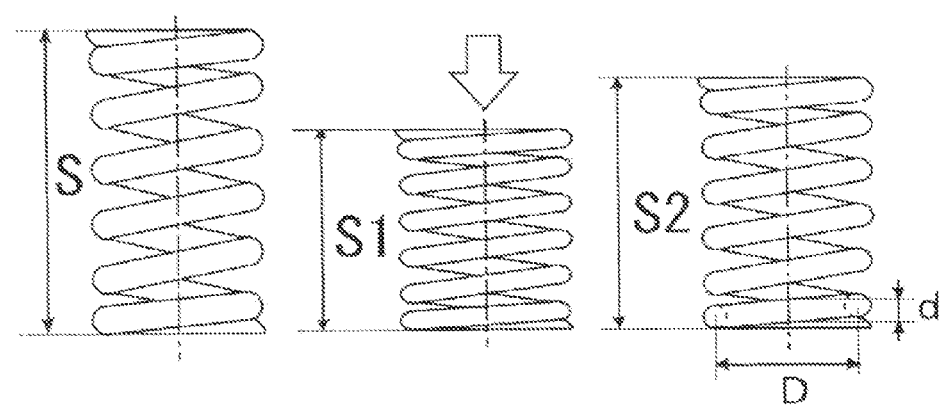
FIG. 3 is illustration which illustrates the state of measurement of a compression coil spring.

Further, as other assessment method in the case where a spring shape is, for example, a compression coil spring, assessment can be indicated by a change amount of a spring free length as in FIG. 3. This is a sagging ratio of a free length according to a calculating equation of {(free length before test S−free length after test S0)/free length before test S}×100, and can be obtained by the above calculating equation after removal of a load accompanied with stress loading in the heat atmosphere as in the case of the shearing strain. In this case, the sagging ratio is preferably 12% or less, more preferably 10% or less, and assessment is not limited to these weight and length, but assessment can be performed by comparing properties of displacement amounts in various forms.

EXAMPLES

Then, the copper alloy wire of the present invention together with a process for producing it will be further explained as Examples.

Example 1

Test 1

Specification of Raw Materials

Using a continuous casting machine having a graphite template equipped with a water cooling jacket at a periphery thereof, a total of 8 kinds of copper alloy materials (test materials A to H) which become a composition shown in Table 1 were melted, a rod wire having a wire diameter of 9.5 mm was obtained via hot rolling. On the other hand, as a comparative material, rod wires having a wire diameter of 6 to 8 mm from a copper silver alloy material (comparative material a) corresponding to Patent Literature 1, the conventional beryllium-added copper alloy material (comparative material b), and other two kinds of copper alloy materials (comparative materials c, d) were used.

TABLE 1

|  |  | Ni | Al | Si | Ti | B/P | Others | Remainder | A value * |
|---|---|---|---|---|---|---|---|---|---|
| Examples | Test material A | 13.0 | 1.2 | 0.5 |  |  |  | Cu | 9.25 |
|  | Test material B | 12.1 | 0.9 | 0.4 |  | B: 0.010 | Fe: 0.23 | Cu | 9.40 |
|  | Test material C | 13.4 | 1.4 | 0.7 | 0.18 | B: 0.008 P: 0.1% | Co: 0.3 | Cu | 7.39 |
|  | Test material D | 11.9 | 0.8 | 0.3 |  |  | Cr: 0.46 Sn: 0.63 | Cu | 11.62 |
|  | Test material E | 7.5 | 1.5 | 0.6 |  | B: 0.008 | Zn: 0.55 | Cu | 7.81 |
|  | Test material F | 6.5 | 1.1 | 0.4 |  | B: 0.008 |  | Cu | 8.90 |
|  | Test material G | 5.9 | 1.3 | 0.5 |  |  | Sn: 0.38 | Cu | 7.90 |
|  | Test material H | 6.0 | 1.1 | 0.55 |  | B: 0.008 | Ti: 0.18 | Cu | 6.36 |
| Comparative Examples | Comparative material a | 2.07 | — | 0.47 | — |  | Ag: 10.3 Sn: 0.33 | Cu | 21.5 |
|  | Comparative material b | 0.13 |  |  | — |  | Be: 1.9 Co: 0.20 | Cu | — |
|  | Comparative material c | 16.6 | 2.02 | 0.45 | — |  | Sn: 0.49 | Cu | 15.81 |
|  | Comparative material d | 6.3 | 1.2 | 0.41 | — |  |  | Cu | 9.2 |

※ A value = (Ni + 20Al)/(8Si)
※

Like this, in test materials A to D, Ni is set to be relatively high, in test materials E to H, an amount of Ni is around 5 to 8%, and each includes addition of a third element, and the A value of the component ratio is adjusted at around 6 to 11.6%. To the contrary, a comparative material a is of low Ni, and contains expensive Ag, a comparative material b contains harmful Be, and a comparative material c contains excessive Ni and, at the same time, has the higher A value than that of test materials. Further, in a comparative material d, for assessing the effect of the present invention, regarding a copper alloy wire having a component composition of the approximately same components as those of the test material F, the working treatment condition thereafter is made to be different, thereby, a ratio of an X-ray diffraction intensity in a copper alloy wire was made to be outside the aforementioned range.

Test 2

Wire Drawing Workability

Further, rod wires of these raw materials were subjected to cold wire drawing working at a final working ratio of 83% while cold wire drawing working and solution heat treatment were performed repeatedly, to obtain a hard copper alloy wire having a finishing wire diameter of 0.7 mm, respectively. In these wire drawing working and heat treatment, reduction in a diameter could be performed without a particular problem and, from this, it was confirmed that a copper alloy wire has sufficient workability. However, the comparative material d was set so that a final working ratio became 55%.

Test 3

Aging Treatment Property

Then, the effect of mechanical property due to low temperature heat treatment (HT treatment) which is performed after spring forming was confirmed, on the premise that these alloy wires are used as a spring product.

In the test, when each alloy wire was cut into a predetermined length, and each was treated in the condition of a temperature of 360° C., and 0.5 to 3.0 Hr, change in property of tensile strength, elongation, reduction of area, electrical conductivity was obtained, the heating atmosphere was due to a high purity argon gas having a dew point of −85° C., and in cooling, a temperature was lowered to the room temperature state in around 4 seconds by forced gas cooling, and one example of the results is shown in Table 2.

In addition, the conditional value Y1 in this aging treatment was set to be 360.

TABLE 2

|  | Increase amount (MPa) | Elongation (%) | Reduction of area (%) | Proof stress ratio | Electrical conductivity (% IACS) | Increase amount (% IACS) | Production workability | Increase amount (MPa) |
|---|---|---|---|---|---|---|---|---|
| Test material A | 1007/1140 | 113 | 3.0/1.0 | 47.9/46.0 | 76.5/79.5 | 13.3/15.9 | 2.6 | ◯ |
| Test material B | 1065/1172 | 107 | 2.5/1.1 | 48.7/46.5 | 78.3/82.4 | 11.7/12.4 | 0.7 | ◯ |
| Test material C | 1117/1269 | 152 | 1.7/1.0 | 47.5/45.0 | 80.1/84.4 | 11.1/12.3 | 1.2 | ◯ |
| Test material D | 1048/1234 | 186 | 1.5/1.1 | 52.5/49.2 | 83.3/88.5 | 11.5/12.1 | 0.6 | ◦ |
| Test material E | 985/1029 | 107 | 3.4/2.0 | 53.7/50.3 | 72.5/75.8 | 15.4/17.7 | 2.3 | ◯ |
| Test material F | 968/1071 | 103 | 3.7/2.4 | 55.7/52.6 | 70.2/73.2 | 17.9/21.0 | 3.1 | ◯ |
| Test material G | 951/1057 | 106 | 3.9/2.6 | 56.1/53.3 | 70.1/72.8 | 18.3/21.7 | 3.4 | ◯ |
| Test material H | 1037/1226 | 189 | 1.8/1.6 | 52.3/48.9 | 84.1/89.9 | 11.9/12.9 | 1.0 | ◯ |
| Comparative material a | 1320/1369 | 49 | 3.6/2.0 | 56.8/53.2 | 86.2/87.6 | 27.6/28.1 | 0.5 | ◯ |
| Comparative material b | 972/1340 | 368 | 1.5/1.0 | 60.8/48.0 | 75.3/92.4 | 17.4/24.2 | 6.8 | ◯ |

TABLE 2-continued

| | Increase amount (MPa) | Elongation (%) | Reduction of area (%) | Proof stress ratio | Electrical conductivity (% IACS) | Increase amount (% IACS) | Production workability | Increase amount (MPa) |
|---|---|---|---|---|---|---|---|---|
| Comparative material c | 1184/1270 | 86 | 1.8/1.1 | 46.5/40.1 | 71.5/75.9 | 8.7/9.6 | 0.9 | ○ |
| Comparative material d | 853/926 | 73 | 3.6/2.9 | 56.3/52.4 | 62.5/67.0 | 20.9/21.8 | 0.9 | ○ |

※*In Table, numerical values in an oblique upper row are respective properties after cold wire drawing, numerical values in a lower column are respective properties after aging treatment, and an increase portion due to the aging treatment is shown as an increase amount. In addition, a proof stress ratio is a numerical value which is a ratio obtained by dividing σ0.2 with σB.

As seen in this result, the material of each Example of the present invention is inferior a little to a beryllium copper alloy of the comparative material b, but in the state of cold wire drawing, that is, in the state of the copper alloy wire of the present invention, the material has the tensile strength of about 900 to 1200 MPa in all cases and, at the same time, has high electrical conductivity of around 11 to 18% IACS, and those properties are further improved by aging treatment thereafter, and it was recognized that the material is sufficiently suitable for use as an electrical conductive spring. Further, workability thereof was also good. Such the improvement in the property is presumed to be due to the effect of a $Ni_5Si_2$ compound having an average particle diameter of around 0.2 to 2 μm, which was confirmed in a parent material matrix, and an oxidized film on a surface of the alloy wire was very thin such as 50 nm or less.

Test 4

X-Ray Diffraction Property

Then, as property thereof, the relationship of A:B:C in A: (111) plane, B: (200) plane and C: (220) plane of intensity peaks thereof was obtained from an X-ray diffraction spectrum of each alloy wire in the cold wire drawing state. Measurement was performed with RINT-2500 manufactured by Rigaku using a radiation source Co-Kα, the result is shown in Table 3, and it was confirmed that the alloy wire is provided with a predetermined texture. Further, as a reference, two examples of comparative materials a and d are exemplified together.

The measuring condition is as follows:

TABLE 3

| | Intensity ratio (A:B:C) | Coiling workability |
|---|---|---|
| Test material A | 1:2.3:5.1 | A |
| Test material B | 1:2.9:6.3 | A |
| Test material C | 1:3.5:7.4 | A |
| Test material D | 1:2.6:5.9 | A |
| Test material E | 1:1.8:3.9 | A |
| Test material F | 1:1.7:2.9 | A |
| Test material G | 1:1.6:2.7 | A |
| Test material H | 1:1.9:2.8 | A |
| Comparative material a | 1:5.3:7.2 | A |
| Comparative material d | 1:0.9:1.9 | C |

Test 5

Coiling Spring Workability

As specific utility of the alloy wire of the present invention, a coil spring of the following specification was coiling-worked, and assessment of workability thereof and property of the resulting spring product was performed together. The result is shown in Table 3.

| Spring shape | Compression coil spring |
|---|---|
| Coil central diameter | 7.66 mm (D/d = 10) |
| Free length | 13.5 mm |
| Total number of turns | 6.5 (pitch 1.6 mm) |

In coiling processing, a coil spring of the aforementioned specification was continuously forming-processed with a spring forming machine (Model VF712EL) manufactured by Shinko Machinery Co., Ltd. for every test material under the condition of a rate of 60 springs/min., processing workability and a variation degree of a spring free length were organoleptically assessed by four stages of A (good) to D (bad), and all of the alloy wires of the present invention could be coiling-processed well.

Test 6

Heat Sagging Property Test

Then, the thus obtained coil springs were continuously low temperature tempering-treated (aging-treated) with a conveyor furnace, respectively, to obtain an objective spring product.

Tempering treatment is performed at the condition under which the spring is heated under the condition of temperature 350° C.×30 minutes and, thereafter, air-cooled, thereby, a processing strain is overcome to attempt to improve property.

Figure 4A:
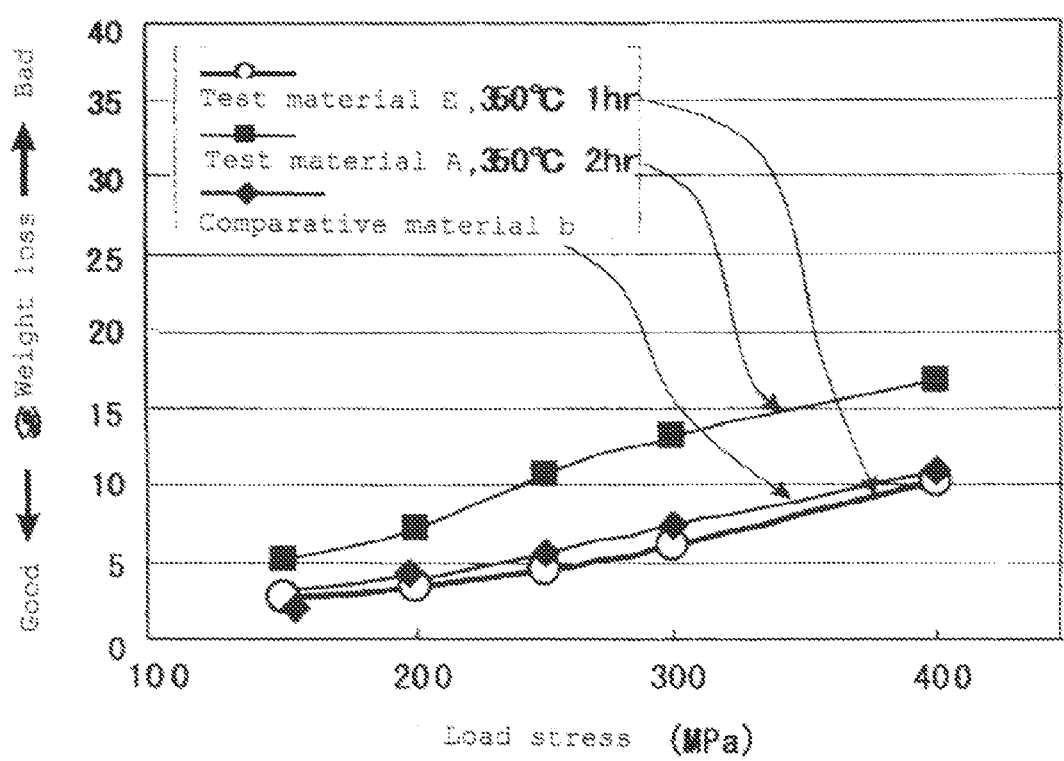
FIG. 4A shows the property of the copper alloy wire of the present invention based on Examples, indicating a relationship between a load stress and a weight loss due to a component composition.

Further, concerning a heat sagging property test on a spring product, a method of installing the spring product in a test jig in the state where a load stress (150 to 400 MPa) which had been set in advance was applied, and setting this in a furnace heated at a temperature of 125° C., and heating and allowing this to stand over about one week was adopted. Further, change in a free length of a coil spring before and after a test was compared by the aforementioned calculating equation, and change in a heat sagging ratio and a residual shearing strain relative to each stress is shown in Table 4. Similarly, in FIG. 4A, regarding respective copper alloy wires of test materials A and E of the present invention, and a comparative material b, comparison between a loaded stress and a weight loss is shown, and FIG. 4B similarly shows change in a loaded stress and a weight loss due to a difference in the aging treatment condition.

As seen in these results, in the test materials of the present invention, at a stress of 250 MPa, a heat sagging ratio is merely 6 to 8% in all cases, and also at a loaded stress of 400 MPa, a heat sagging ratio results in nearly 10% or less, and the property of the test material E was approximate to that of beryllium of the comparative material b.

Further, also regarding change in spring property due to a difference in the heat treatment condition, the results of a sagging ratio (%) of a spring free length, a weight loss (%), a transverse elastic coefficient (MPa), and a residual shearing strain (%) in the case of a loaded stress of 150 to 400 MPa under a heating temperature of 300 to 450° C.×0.5 to 3 Hr (cooling rate 100° C./sec.) are shown in Table 4, and are compared with properties of beryllium copper of the comparative material b.

TABLE 4

| | Aging condition | Loaded stress (MPa) | Free length sagging ratio (%) | Weight loss (%) | Transverse elastic coefficient (MPa) | Residual shearing strain (%) |
|---|---|---|---|---|---|---|
| Test material A | 350° C. 1 hour | 400 | 8.0 | 20.2 | 39,200 | 0.113 |
| | | 250 | 3.7 | 9.5 | 37,200 | 0.054 |
| | | 150 | 1.6 | 2.1 | 37,900 | 0.011 |
| | 350° C. 2 hours | 400 | 7.3 | 15.7 | 41,000 | 0.089 |
| | | 250 | 5.0 | 10.7 | 40,200 | 0.059 |
| | | 150 | 2.5 | 3.0 | 41,500 | 0.018 |
| | 350° C. 3 hours | 400 | 7.3 | 17.9 | 41,000 | 0.100 |
| | | 250 | 4.4 | 10.9 | 40,700 | 0.059 |
| | | 150 | 3.3 | 5.2 | 40,200 | 0.029 |
| | 400° C. 30 minutes | 400 | 10.7 | 26.1 | 40,000 | 0.143 |
| | | 250 | 6.1 | 13.8 | 39,300 | 0.076 |
| | | 150 | 3.4 | 7.0 | 39,000 | 0.037 |
| Test material E | 350° C. 1 hour | 400 | 3.9 | 10.3 | 42,200 | 0.056 |
| | | 250 | 1.9 | 4.5 | 41,900 | 0.025 |
| | | 150 | 1.1 | 2.7 | 41,900 | 0.015 |
| Comparative material b | | 400 | 3.4 | 13.1 | 45,600 | 0.110 |
| | | 250 | 2.1 | 8.1 | 45,400 | 0.060 |
| | | 150 | 0.3 | 1.2 | 45,200 | 0.010 |

Figure 4B:
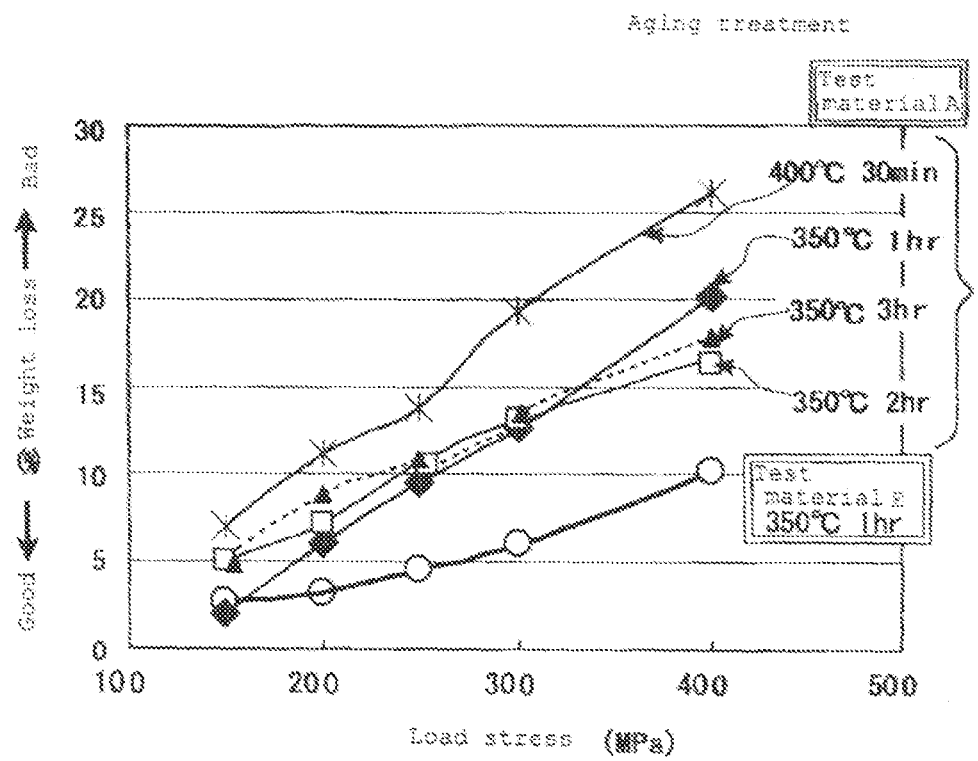
FIG. 4B shows the property of the copper alloy wire of the present invention based on Examples, indicating change in the same property due to the aging treatment condition.

As a result, all materials which were heat-treated at an aging treatment temperature of 350 to 400° C. have a residual shearing strain of 0.15% or less, and are excellent, and particularly, it is seen from FIG. 4B that a longer aging time, for example, 2 Hr or longer is preferable. Further, when a cross-sectional structure of the alloy wire was observed with a microscope, a γ phase ($Ni_3$ (Al, Si)) having an average particle diameter of 0.01 to 0.1 μm, and which was precipitated at a distribution ratio of around 0.1 to 0.8%, and a $Ni_5Si_2$ compound having a size of an average particle diameter of about 1.8 μm were mixed.

Example 2

As other form of the copper alloy wire of Table 1, with a suspension spring for optical pickup as a target, regarding test materials B and F and a comparative material c, fine wires of hard copper alloys having a finishing wire diameter of 0.080 mm were obtained, respectively, from raw material rod wire materials, by final 99% wire drawing while cold wire drawing and heat treatment were performed repeatedly as in Example 1.

Even in such the fine diameter processing treatment, there was no trouble such as breaking down of a wire and cracking, wires had good manufacturability, and strength property, electrical conductivity and an X-ray strength ratio were more excellent than those of Example 1 as in Table 5. In addition, in this X-ray test, since a fine wire thereof was of a fine diameter, a test was performed by a method of arranging a plurality of fine wires parallel to ensure a predetermined measurement area.

TABLE 5

| | Tensile strength (MPa) | Electrical conductivity | X-ray intensity ratio |
|---|---|---|---|
| Test material B | 1228 | 11.5 | 1:2.7:6.7 |
| Test material F | 1115 | 16.8 | 1:1.6:3.5 |

TABLE 5-continued

| | Tensile strength (MPa) | Electrical conductivity | X-ray intensity ratio |
|---|---|---|---|
| Comparative material c | 880 | 9.5 | 1:3.5:2.0 |

The thus obtained processed fine wire was set in a straight correcting machine to cut it into a length of 20 mm, and this was heat-treated in a heat treating furnace at a temperature of 300° C. for 180 seconds to obtain a straight spring product having improved property. Straightness thereof was good without abnormality which is seen as a particular problem, regarding 20 samples which were extracted for every lot. The FIG. 1 is a compound on a transverse section of the test material F obtained in the present Example, and herein, a microscopic plane was merely mirror-polished and magnified so that only the compound can be confirmed. In a separate test, it was confirmed that in the test material which had been corrosion-treated, an intensity ratio is slightly changed by this aging treatment, but the material similarly has the texture still remaining in the cold-worked state.

Further, for assessing heat sagging of this each straight spring, a heat resistance sagging test of setting each spring in a fixing jig, arranging the spring in a furnace warmed to a test temperature of 125° C. in the state where a loaded stress of 600 MPa was imparted to the other end thereof, allowing to stand this for one week, taking out this, and comparing a weight loss after removal of a load was performed.

The test result was that a weight loss was 18% in the comparative material c, while a weight loss was 6% in the test material B, and a weight loss was 8% in the test material F, and it was recognized that the test materials improve property more considerably than the comparative material.

Example 3

Hardwires of two kinds of copper alloy wires (fine diameter 0.7 mm) of test materials A and G obtained in Example 1 was used, and these were set in a cold rolling machine as they were, and rolled at multiple stages to obtain fine belt wires (0.3×0.9 mm) having a flattened cross section. By this rolling, the tensile strength was further improved by around 8 to 10%, any test material had no defect such as breaking down of a wire and material cracking, and good workability was confirmed.

Then, after a lubricant and impurities on a surface of the resulting processed belt wire were washed out, aging heat treatment using a tubular heating furnace set at a temperature of 440° C. was performed. This heat treatment was according to a strand system of performing heat treatment while the belt wire was supplied at a constant rate, the wire was heated in a range of 10 to 120 seconds in the heating atmosphere in the oxidization-free state with an argon gas (dew point −99° C.), and cooling was such that the wire was rapidly cooled by forced ventilation with an argon gas. A cooling rate was such that a temperature of the wire was lowered to the room temperature state in a short time of about 5 seconds or shorter, thereby, fine γ' of $Ni_3$ (Al, Si) of the $L1_2$ structure was formed in the interior of the alloy wire.

Further, thereupon, the alloy belt wire for supply was sent out while a reverse tensile force not more than a proof stress value had been loaded in advance on a supply side thereof, and setting was conducted so that the wire was heated via a multistage mechanical roll correcting step, aging was performed while a processing strain generated at a cold working stage was overcome with such the correcting means, true straightness of the resulting alloy belt wires could be enhanced to 3 to 5/100 mm in all cases, and other properties were also satisfactory.

Example 4

Next, the two kinds of alloy belt wires obtained in Example 3 were cutting-treated into a length of 30 mm while they were further roll-corrected, to obtain straight pin-like spring products. Secondary aging treatment of placing them on a continuously running exclusive-use conveyor, and introducing the conveyor into a ring heating furnace heated at a temperature of 380° C. was performed.

In this heat treatment, a time was set at 10 minutes, the wire was heated in the oxidation-free atmosphere with a high purity argon gas as described above, and in cooling after heating, the wire was cooled with a gas so that it was cooled instantaneously, and a cooling rate exceeded 50° C./sec. By this multistage aging treatment, a spring product in which compounds of various particle diameters are complexly formed in the interior of the alloy wire was obtained.

The property results are listed in Table 6, particularly, electrical conductivity and the tensile strength were improved, respectively, the surface state had the brilliant surface state accompanied with high deformation, an oxidized film on a surface was very thin such as about 30 nm as measured by surface analysis with an EPMA apparatus, in all cases, this was allowed to stand under humid environment of a humidity of 60% for one week, and the discoloration circumstance of a wire surface thereafter was investigated, corrosion and discoloration were not particularly seen, and good corrosion resistance was confirmed.

Further, wettability of a solder was assessed by an area ratio of a wetted portion after the test materials were immersed in a 60Sn/40Pb solder tank at 245° C. for 5 seconds, it was confirmed that all have good wettability, and from this, for example, it is expected that, when this is subjected to soldering working for electronic instruments, a working efficiency is enhanced without accompanying a special drug and surface treatment.

TABLE 6

| | Electrical conductivity (% IACS) | Tensile strength (MPa) | Proof stress ratio | Diffraction intensity ratio A:B:C | Solder wettability | Corrosion resistance |
|---|---|---|---|---|---|---|
| Test material A | 17.2 | 1202 | 81.8 | 1:2.6:5.7 | Good | Presence |
| Test material G | 21.9 | 1142 | 76.2 | 1:1.9:3.3 | Good | Presence |

According to this result, regarding the intensity ratio, a Cu plane (111) of a base, that is, a diffraction intensity A is reduced by aging treatment, and other intensity ratio is enhanced accompanying therewith.

As apparent from the foregoing results, since the copper alloy material in accordance with the present invention has sufficient property for forming a spring, undergoes influence of heat with difficulty, and has sufficient electrical conductivity, the copper alloy material can be used as a material for an electrically conductive spring which copes with heat sagging, for example, for semiconductors and precision electronic instruments, and further has excellent advantage as a substitute material for the conventional copper alloy containing a harmful substance such as beryllium.

The invention claimed is:

1. A fine copper alloy wire formed of a filamentary material of a copper alloy containing, in percent by mass, Ni: 5.0 to 13.0%, Al: 0.6 to 3.0%, and Si: 0.3 to 1.2%, with the remainder being composed of Cu and incidental impurities, wherein Ni, Al and Si are contained in the copper alloy so as to satisfy the following relationship:

{(Ni+20Al)/8Si} being 7 to 13, wherein the fine copper alloy wire has a fibrous texture having a crystal particle diameter of a transverse section of 5 μm or less by cold wire drawing working and is provided with the tensile strength (σB) of 900 to 1300 MPa, and electrical conductivity of 10 to 22% IACS, wherein the fine copper alloy wire is formed to have a wire diameter of 0.05 to 3 mm by the cold wire drawing working, wherein the fine copper alloy wire is a precipitation hardening-type copper alloy in which a γ' phase of $Ni_3$(Al, Si) alone is formed in a parent phase thereof, by aging treatment, or a precipitation hardening-type copper alloy in which an intermetallic compound of $Ni_2$(Al, Si) and/or an intermetallic compound of $Ni_5Si_2$ are formed in a parent phase thereof, in addition to the γ' phase of $Ni_3$(Al, Si), by aging treatment, wherein a diffraction intensity ratio of A:B:C satisfies 1.0:1.4 to 4.0:2.8 to 5.0, when A represents a diffraction intensity of Cu (111), B represents a diffraction intensity of Cu (200), and C represents a diffraction intensity of Cu (220) according to an X-ray diffraction method in a predetermined cross section of the fine copper alloy wire, wherein the fine copper alloy wire has a proof stress ratio (σ0.2/σB) of the tensile strength relative to a 0.2% proof stress (σ0.2) of 68 to 85%, and wherein the fine copper alloy wire optionally further contains one or two or more of, in percent by mass,
B: 0.001 to 0.050%
P: 0.01 to 0.30%
Ti: 0.1 to 0.8%
Co: 0.1 to 0.8%
Zn: 0.3 to 1.2%
Sn: 0.1 to 1.0% and
Fe: 0.01 to 1.0%.

2. A copper alloy spring having a predetermined spring shape due to a fine copper alloy wire, wherein the copper alloy spring uses the fine copper alloy wire as defined in claim 1, and is such that electrical conductivity is 12 to 22% IACS, and a residual shearing strain measured in a heat sagging test, when the spring is heated to 125° C. and held for one week in the state where a stress of 400 N/mm² is loaded, is 0.15% or less, and wherein the intermetallic compound has an average particle diameter of 4 μm or less, and an occupying area ratio in a range of 0.05 to 30%.

* * * * *